Oct. 14, 1952　　B. CARNIOL　　2,614,153
METHOD OF AND DEVICE FOR MEASURING AND CONTROLLING THE
QUALITY FACTOR AND DAMPING FACTOR OF ELECTRIC CIRCUITS
AND COMPONENTS THEREOF
Filed April 29, 1949　　　　2 SHEETS—SHEET 1

INVENTOR
Bohdan Carniol,
BY

Oct. 14, 1952 B. CARNIOL 2,614,153
METHOD OF AND DEVICE FOR MEASURING AND CONTROLLING THE
QUALITY FACTOR AND DAMPING FACTOR OF ELECTRIC CIRCUITS
AND COMPONENTS THEREOF
Filed April 29, 1949 2 SHEETS—SHEET 2
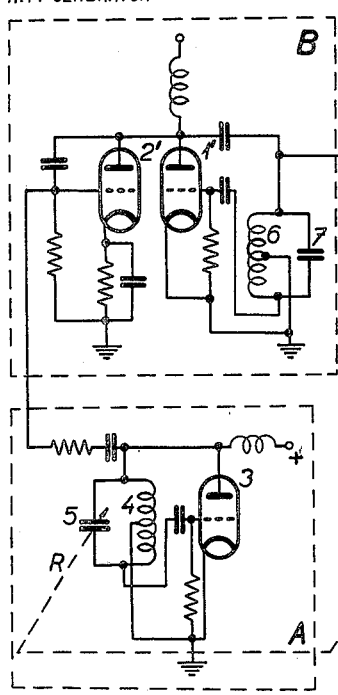
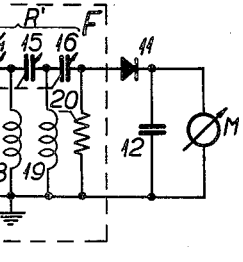
Fig. 3
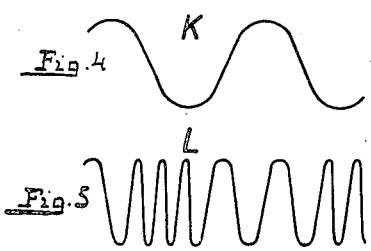
Fig. 4
Fig. 5
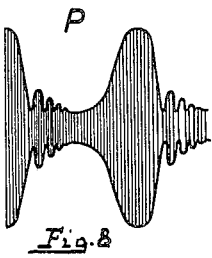
Fig. 8
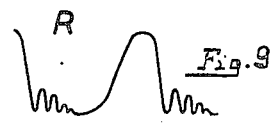
Fig. 7
Fig. 9
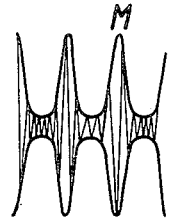
Fig. 6
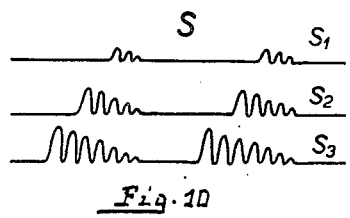
Fig. 10
INVENTOR
Bohdan Carniol
BY
ATTORNEY Patented Oct. 14, 1952

2,614,153

UNITED STATES PATENT OFFICE 2,614,153

METHOD OF AND DEVICE FOR MEASURING AND CONTROLLING THE QUALITY FACTOR AND DAMPING FACTOR OF ELECTRIC CIRCUITS AND COMPONENTS THEREOF

Bohdan Carniol, Prague, Czechoslovakia, assignor of one-half to Tesla, National Corporation, Prague, Czechoslovakia Application April 29, 1949, Serial No. 90,493
In Czechoslovakia May 18, 1948

8 Claims. (Cl. 175—183)

This invention relates to a method of and apparatus for rapid and accurate measurement of the quality factor and damping factor of electric circuits and components thereof.

In the mass production of light-current, especially of high-frequency, equipment, it is necessary to determine the permissible lowest value of the quality factor Q, in order to ensure that the required properties of tuned circuits, or their components (coils, capacitors, etc.), will be obtained. This lowest value of the quality factor must be strictly observed, otherwise the quality of the circuit or of the whole apparatus of which the circuit is a part might be seriously endangered and the whole equipment thus deprecated. In view of the required high standards of control of the quality factor, it is not sufficient to rely merely upon construction techniques or testing of selected samples from each production batch. Each component must be individually tested. With present methods and equipment, such testing of each individual component is not feasible from a production standpoint, as the time and complications involved seriously hinder mass production.

With the foregoing in mind, the present invention is directed to a method and apparatus whereby each component may be rapidly and accurately tested for the quality and damping factors. This is effected by connecting the measured circuit or the measured component contained in a resonant circuit to a source of alternating potential, applying to such circuit from said source a frequency or amplitude modulated wave, whose rate of modulation bears a definite relation to the time constant of the circuit, and comparing the beat produced between the forced oscillation impressed on the circuit and the free oscillation produced in the circuit due to the modulation taking place at a definite rate, with the time constant of the circuit. This procedure will give an accurate and rapid measurement of the quality and damping factors of the component, and, in effect, amounts to using transient phenomena of a circuit to determine the required factors.

For a clear understanding of the invention principles, reference is made to the following description and the accompanying drawing. In the drawing:

Fig. 3 is a schematic wiring diagram illustrating the internal circuits of the blocks shown in Fig. 2.

Figs. 4 through 10 are illustrations of the wave forms at different portions of the system.

The majority of the working principles of hitherto known Q-meters is based on the fundamental definition of the quality factor, that is $$Q = \omega L/R = 1/\omega CR$$

Figure 1:
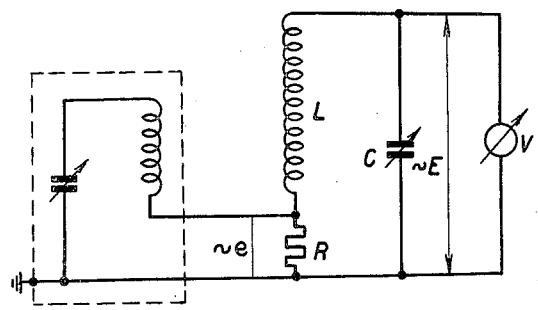
Fig. 1 is a schematic wiring diagram of a known type of quality factor measuring arrangement.

One such measuring instrument is shown in Fig. 1. An alternating voltage $e$ of known frequency and amplitude is supplied to a small resistor R connected in series with the tuned circuit. We then tune the circuit, or adjust the frequency of the oscillator to the resonant frequency of the circuit, and measure the voltage E appearing, e. g., across the tuning condenser C, by means of an electronic voltmeter or a thermocouple V. The quality factor Q is given by the ratio E/e. However, the results of such measurements are only approximate and, in addition, the measuring procedure is tedious and lengthy, especially in mass production because the device requires retuning for each individual circuit or component measured. This entails loss of time and the possibility of errors through inaccurate measurement.

Other methods employ, e. g. bridges or calculate the quality factor from the shape of the resonance curve of the circuit. These methods, however, are often still more laborious than the first mentioned one and must, therefore, be considered as laboratory methods unsuited for mass production.

All above mentioned methods measure the quality factor by means of a comparison between some properties of the tuned circuit or its parts, in the steady state condition.

The present invention measures the quality factor by means of transient phenomena in the circuit. A rigorous mathematical analysis of transient phenomena, produced in a tuned circuit by applying to it a frequency modulated voltage, can be obtained by the Heaviside operator method. This method is rigorous but lengthy, in addition to being generally well known, and can be obtained from any pertinent treatise. A more simplified concise method can be used. The majority of publications dealing with said transient phenomena employ the Heaviside operator method for solving the transient characteristic, i. e. the curve indicating the shape of the output voltage V, being the function $\phi$ of the time $t$ from the moment a suddenly applied unit voltage has been impressed on the input ($V = \phi(t)$).

If the impressed input voltage differs from said simple unit voltage which represents the simplified ideal case, it is considered as the sum of an infinite number of suddenly applied Heaviside unit changes acting during infinitesimally small time periods and having different amplitudes. The sum of such infinite number of elementary transient characteristics gives the resulting output voltage (see, e. g. E. E. Mott, Indicial Response of Telephone Receivers, The Bell System Techn. Journal, 1944, April, p. 135).

This procedure also gives information about what happens if an alternating sinusoidal voltage is suddenly applied to the tuned circuit, the applied said voltage being initially unmodulated containing no modulation whatsoever, in the first place. The resulting transients have been analyzed, e. g. by D. G. Tucker in his paper The Transient Response of a Tuned Circuit, Electronic Engineering, 1946, December, p. 379.

If the alternating voltage is suddenly applied to the tuned circuit, there are fundamentally two possible results:

1. If the frequency of the applied voltage is identical with the natural frequency of the circuit, the natural oscillation and the forced oscillation are in phase opposition, and since the natural frequency dies out in accordance with the time constant of the circuit $$\odot = \frac{2L}{R} = \frac{1}{\beta}$$

the current in the circuit follows the equation $$i = A(1 - e^{-\beta t}) \sin(\omega_0 t + y)$$

2. If the frequency of the applied voltage is different from the natural frequency of the tuned circuit, beats are produced between the forced oscillation and exponentially decaying free oscillation, said beats being of course also exponentially damped. The amplitude of said beats depends on the relationship between the applied frequency and the frequency of the free oscillation and on the phase of the forced oscillation at the moment of switching in.

These free oscillations of the circuit are produced not only in the case of application of an ideal sudden alternating voltage, i. e. in the case of an infinitely steep rise of the forced oscillation, but also in the case of a finite rate of the rise of the forced oscillation, as long as the rate of the rise will be higher than the rate at which the tuned circuit can follow the voltage change due to its time constant. It is generally known that the transient characteristic will necessarily appear whenever there is impressed on any circuit a voltage which changes quicker than can be followed by the circuit.

If the voltage is suddenly removed, e. g. by closing a shunting switch at a time $t_1$, the voltage across the circuit cannot cease instantaneously, but it decays exponentially in accordance with the time constant of the circuit. That means that at the moment $t_1$ the circuit produces its natural oscillation (since, from this moment not external voltage is applied to it) which decays in accordance with the time constant thereof. It is, of course, self-evident, that the shape of the decaying oscillation will be the same, even if at the time $t_1$ the external voltages will not be removed suddenly, but e. g. so that the external voltage dies out linearly from the initial moment $t_1$ to the final moment $t_2$. It is obvious that the tuned circuit can follow neither a sudden interruption of the exciting voltage, nor a decrease thereof which is quicker than the time constant. Of the second case, i. e. where the exciting voltage dies out after a certain time, it may also be said that the difference of the output voltage given by the difference between the actual exponential decay and the linear decrease of the exciting voltage has been produced as the interference (sum) between the linearly decreasing exciting voltage and the exponentially decaying free oscillation produced at the moment $t_1$—of course in this case, with a smaller initial amplitude due to the finite rate of decrease of the exciting voltage. If the exciting voltage is allowed to decrease in accordance with the time constant of the circuit, or at a lower rate, the output voltage will accurately follow the amplitude change of the input voltage, since the time constant of the circuit does no longer present an obstacle. This means that, in this case, no free oscillation will be produced in the circuit.

The above simplified example is of general application, and the reactions of the circuit will be fundamentally the same, no matter whether the voltage across the circuit is reduced or increased, and no matter what characteristic the voltage change possesses, the only difference being that in accordance with conditions the initial phase and the initial amplitude of the free oscillations is varied, which results in a different interference product.

If the frequency of the forced oscillation is different from the frequency of the free oscillation (only one single free oscillation is produced in the tuned circuit no matter what frequency is applied thereto), beats will be produced between the free oscillation and the forced oscillation.

If, instead of an amplitude change of the exciting voltage, a frequency change is applied to the tuned circuit (e. g. a carrier whose frequency varies from $f_1$ to $f_2$), the circuit itself transforms said frequency changes into amplitude changes. If, due to a slow frequency change, the resulting amplitude change is slower than the time constant of the circuit, amplitude changes are produced across the circuit which are proportional to the frequency changes of the exciting voltage. As long as the time constant of the circuit is longer than the expected rate of change of the amplitude due to the frequency, a free oscillation will be produced which, of course, beats with the forced oscillation, and the envelope has exponentially decreasing maxima and minima. The frequency of these beats is given by the difference between the free oscillation and the forced oscillation. Since the frequency of the forced oscillation is, at one time, $f_1$, and, at another time, $f_2$, the beat frequency is $F_0 - f_1$ and $F_0 - f_2$, respectively. Photographic reproductions of actual oscillograms prove the above statements.

If now the frequency of the input voltage is continually varied (corresponding amplitude changes thus being produced in the output voltage due the resonance curve), this continual change, no matter whether sinusoidal, triangular or of any other change, can be thought of as the sum of infinitesimal elementary frequency unit changes to which corresponds the sum of infinitesimal amplitude unit changes resulting in beats between the forced and free oscillation as long as the voltage change across the circuit is quicker than admissible with regard to the time constant of the circuit, but the beat frequency is not constant. It varies simultaneously with variations of the forced oscillation. In any case, these beats appear as components determined by the difference between the frequencies of the free and forced oscillations, this difference being relatively high over the major part of the modulation cycle so that it appears as a sudden rise of the harmonic content of the previously "smooth" or undistorted envelope.

Figure 2:
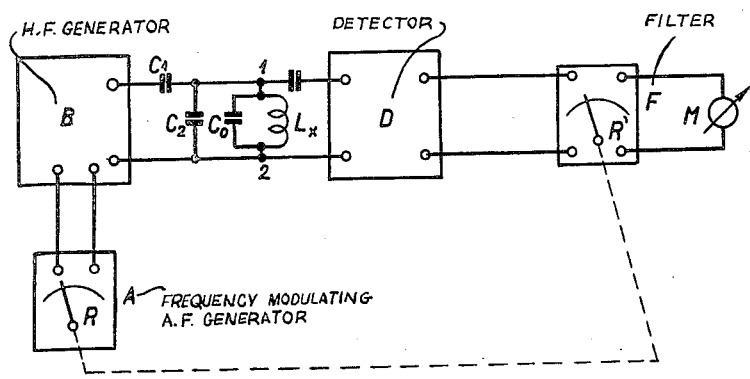
Fig. 2 is a schematic wiring diagram of the invention apparatus.

In the new measuring device, the measured circuit is supplied with an alternating voltage (current) of a periodically varying frequency (frequency modulated). The rate at which the frequency is varied can be adjusted, e. g. by varying the frequency which produces the frequency modulation. Since the time constant $\odot$ is a quantity which is directly proportional to the quality factor, according to the relation $\odot = 2Q/\omega$ it is possible to adjust, for a determined minimum quality factor, a certain limiting speed of frequency modulation, at which a beat frequency is still produced. To test whether a circuit component has the requisite quality factor, the component can be connected to the invention measuring apparatus, without any re-tuning or re-adjustment of the latter, and the apparatus observed to see whether beat frequencies are produced or not. If no beat frequency is produced, the quality factor of the tested circuit is below tolerance; in the opposite case, the quality factor is in order. The production of the beat frequencies can be watched by any known method, e. g. on an oscillograph, or by measuring the non-linear distortion of the envelope curve. Production of a beat frequency is characterised by a substantial increase in non-linear distortion which is, therefore, a direct measure of the quality factor. If we are only concerned with the measurement of components of the tuned circuit (coils or capacitors), the measurement is accomplished in a similar way, the complementary part of the tuned circuit (that is the capacitor or coil (being permanently connected to the input terminals. A typical embodiment of the invention measuring apparatus is shown in Fig. 2 as including a high-frequency generator B giving a sinousoidal output of a frequency near the resonant frequency of the measuring tuned circuit comprising a fixed capacity $C_2$ and the measured inductance $L_x$. $C_0$ indicates the self capacity of the measured inductance. $C_2$ is of a sufficient high value compared with $C_0$ so that variations of $C_0$ which occur in practice with different coils have substantially no effect on the resonance of the measuring circuit. Slight variations of inductance of the tested coils which will occur in practice will also have only a negligible effect on the resonance of the measuring circuit. Frequency modulation of the output of generator B is provided by an external source represented by A. F. moduation generator A of known design. The frequency, or amplitude or the shape of the modulation voltage or any other feature of the modulation output which affects the rate of frequency modulation, and, thereby, also the magnitude of the beats produced, is controlled by regulator R. In the present case R controls the modulation frequency and comprises a switch by means of which the frequency of generator A is controlled. The output of generator B is frequency modulated by the output of generator A, say from $0.5f_0$ to $2f_0$, $f_0$ being the resonant frequency of the measuring circuit. The shape of the modulation output of generator A may be triangular, sinousoidal or of any other convenient shape. The modulated output of generator B is fed to the measuring circuit through a small capacity $C_1$. The measuring circuit acts as discriminator transforming frequency modulation into amplitude modulation. As long as the time constant of the measuring circuit can follow the amplitude changes, the envelope of said amplitude modulated oscillation is given by the characteristic of the frequency change and the selectivity curve and may be conveniently found from said curves. After detection in detector D we obtain a low frequency representing said envelope and comprising frequency components which can be found as said above. The envelope is substantially undistorted. As soon, however, as the amplitude changes occur at such a rate that the time constant of the measuring circuit does not allow the circuit to follow same, the free oscillation of the tuned measuring circuit is periodically produced, decaying exponentially, but repeating itself again and again on the steep tails of the selectivity curve. The forced oscillation, which is frequency modulated, and the free oscillation, which is of constant frequency but of an exponentially decaying amplitude, beat with each other and produce parasitic maxima and minima on the envelope which also appear in the low frequency output of the detector D. In accordance with Fourier's analysis this means that the higher harmonic components in the frequency spectrum of said low frequency output rise suddenly and they can be measured by known methods, e. g. by a device for measuring non-linear distortion. The state where there are no beats and the state where beats occur becomes very obvious, if, e. g. all low frequency components up to the second, fourth or sixth harmonic of the modulation frequency are filtered out by means of filter F so that the measuring instrument M is only affected by components above the second, fourth or sixth harmonic, said components being present only to a negligible extent as long as there are no beats, but becoming very noticeable as soon as beats occur. The lower limit of the pass band of said filter comprising R-C elements is controlled by known means, e. g. by a change of the capacities of the filter and the like, by means of regulator R' comprising a switch in gang with switch R whereby the desired capacities of the R-C filter are connected in the circuit.

It is clear that the device responds to the time constant and hence also to the quality factor of the measuring circuit.

If a series of inductances of the same type is to be tested, the modulation frequency of generator A is adjusted by means of a standard inductance of said series of inductances and switch R, to such a rate of frequency change producing a corresponding rate of amplitude change that beats will just occur to a noticeable extent. The filter F is also correspondingly adjusted by means of switch R' in gang with R. This is, however, not an essential condition. The tested coils are then successively substituted for the standard coil and the measuring instrument M shows directly whether the quality factor of the tested coil is better or worse than the quality factor of the standard. No adjustment of the measuring circuit is required.

Instead of the pointer instrument M an oscillograph may be used. This oscillograph can be connected directly to the output of the measuring circuit or to the output of the detector D and gives an optical indication of the beats.

Another possibility is to use a metering device indicating directly the distortion produced by the beats. Such a device comprises the filter F, which suppresses the lower components, and we measure the effective value of the filter input voltage comprising the lower and higher components, and the effective value of the filter output voltage comprising the higher components only. The ratio between these two values is an indication of the distortion produced by the beats independent of the absolute value of said voltages. A convenient method of establishing this ratio is given by known metering devices comprising two pointer systems. One pointer system is affected by the input voltage, the second pointer system is effected by the output voltage and the intersection of the two pointers shows a line on the scale which can be calibrated directly in percents of distortion independent of the magnitudes of the input and output voltages. If the magnitude of the voltage is varied, the intersection point is shifted along said line, but if the distortion is varied, the intersection point is shifted to another line.

The internal circuits of the device are shown in Fig. 3 and the wave shapes at different portions of the system in Figs. 4 through 10. Thus, generator A is an audio frequency generator comprising an oscillator tube or valve 3 and a resonant circuit including an inductance 4 and a tuned capacitor 5. The output of generator A has the wave form shown at K in Fig. 4.

The generator output is applied to a reactance tube 2', in generator B, connected in parallel with the inductance 6 and capacitor 7 of the resonant circuit of a high frequency generator tube 1'. Thus, the output of tube 1' is frequency modulated by the output of generator A to produce the wave form shown at L in Fig. 5.

The frequency deviation is determined by the amplitude of the output voltage of generator A and the respective circuit constants. The frequency and shape of the modulations are determined by the frequency and shape of the modulating voltage. While this is shown at K as sinusoidal, other suitable wave shapes may be used.

The frequency modulated output L is applied through coupling condenser $C_1$ to the tested circuit $L_x-C_2$, which acts as a discriminator to convert the frequency modulation to amplitude modulation.

If conditions are such that the resultant envelope is undistorted, as when the tested circuit can follow the amplitude changes, the envelope of the AM oscillation is given by the shape of the FM and resonance curve, as shown at M in Fig. 6.

After rectification in stage D, comprising a diode 8 with a conventional output circuit, the wave shape of the input to filter stage F is as shown at N in Fig. 7, corresponding to wave form M. Wave form N, of low frequency, represents the undistorted envelope M, and comprises frequency components which can be determined from the shape of the FM and resonance curve.

An example of a distorted envelope, which is produced when the tested circuit cannot follow the amplitude changes, is shown at P in Fig. 8, producing, in stage D, the low frequency wave R (Fig. 9). This can be rectified by dry rectifier 9, whose A. C. component is by-passed through condenser 10 with its D. C. component being measured in instrument $M_1$.

If all harmonics up to the sixth, for example, are filtered out in stage F, the filtered output entering rectifier 11 contains only harmonics higher than the sixth. These are substantially absent as long as there are no beats, but become very marked when beats occur.

The filter output is rectified in dry rectifier 11, with the A. C. component by-passed through capacitor 12 and the D. C. component measured in instrument M.

The lower limit of the pass band of filter F, which comprises capacitors 13—16, coils 17—19, and load resistor 20, is controlled by known means, such as capacity variation. The controlling regulation $R^1$ is ganged with the regulator R of generator A. In the case of a distorted envelope, the wave form entering rectifier 11 is as shown at S (Fig. 10), $S_1$, $S_2$ and $S_3$ indicating the different degrees of distortion present in the envelope of wave form P.

The present invention introduces a method for measurement and control of the quality factor or damping factor which is quicker than hitherto known methods, because no adjustment of the tuning is required for each individual tested object. The new method possesses also a high degree of sensitivity and stability.

It will be apparent from the above that the invention is not limited to the specific arrangement of parts and circuits shown herein for illustration, and that the underlying novel thought is susceptible of numerous variations and modifications coming within its broad scope and spirit, as defined in the appended claims.

I claim:

1. A method of measuring the quality factor and damping factor of electric circuit devices comprising the steps of establishing a resonant circuit containing the circuit device to be measured; impressing on such resonant circuit the output of an alternating generator; modulating such output at a rate such that free oscillations are produced in the resonant circuit in addition to the forced oscillations; and measuring the beat frequency between the forced and free oscillations to determine the relation thereof to the circuit time constant, the latter being a measure of the quality factor.

2. A method of measuring the quality and damping factor of electric circuit devices comprising the steps of establishing a resonant circuit containing the circuit device to be measured; impressing on such resonant circuit the output of an alternating generator; frequency modulating such output at a rate such that free oscillations are produced in the resonant circuit in addition to the forced oscillations; and measuring the beat frequency between the forced and free oscillations to determine the relation thereof to the circuit time constant, the latter being a measure of the quality factor.

3. A method of measuring the quality and damping factor of electric circuit devices comprising the steps of establishing a resonant circuit containing the circuit device to be measured; impressing on such resonant circuit the output of an alternating generator; frequency modulating such output at a rate such that free oscillations are produced in the resonant circuit in addition to the forced oscillations; filtering the beat frequency between the forced and free oscillations to eliminate the lower harmonics; and detecting and measuring the higher harmonics to determine the relation of said beat frequency to the circuit time constant, the latter being a measure of the quality factor.

4. A method of measuring the quality factor and damping factor of electric high frequency circuit devices comprising the steps of establishing a resonant circuit containing the circuit device to be measured; impressing on such resonant circuit the output of an alternating generator; frequency modulating such output at a rate such that free oscillations are produced in the resonant circuit in addition to the forced oscillations; filtering the beat frequency between the forced and free oscillations to eliminate the lower harmonics; and measuring the amplitude of the higher harmonics and that of the beat frequency output for comparison to determine the relation thereof to the circuit time constant, the latter being a measure of the quality factor.

5. Apparatus for measuring the quality and damping factor of electric circuit devices, comprising, in combination, an alternating generator; a resonant circuit containing the circuit device to be measured and connected to the generator output; a modulation generator connected to said alternating generator for modulating the output thereof at a rate such that free oscillations are produced in the resonant circuit in addition to the forced oscillations; and beat frequency measuring means connected to the output of the resonant circuit whereby the beat frequency between the forced and free oscillations may be determined to establish the relation thereof to the circuit time constant, the latter being a measure of the quality factor.

6. Apparatus for measuring the quality and damping factor of electric high frequency circuit devices, comprising in combination, a high frequency generator, a resonant circuit containing the circuit device to be measured and connected to the generator output, a modulation generator connected to said high frequency generator for frequency modulating the output of the latter at a rate such that free oscillations are produced in the resonant circuit in addition to the forced oscillations; means for adjusting the output frequency of said modulation generator; and beat frequency measuring means connected to the output of the resonant circuit whereby the beat frequency between the forced and free oscillations may be determined to establish the relation thereof to the circuit time constant, the latter being a measure of the quality factor.

7. Apparatus for measuring the quality and damping factor of electric high frequency circuit devices, comprising, in combination, a high frequency generator, a resonant circuit containing the circuit device to be measured and connected to the generator output, a modulation generator connected to said high frequency generator for frequency modulating the output of the latter at a rate such that free oscillations are produced in the resonant circuit in addition to the forced oscillations; means for adjusting the output frequency of said modulation generator; a high pass filter connected to the output of the resonant circuit to filter out the lower harmonics of the beat frequency between the forced and free oscillations; and means connected to the filter output to measure the higher beat frequency harmonics to determine the relation thereof to the circuit time constant, the latter being a measure of the quality factor.

8. Apparatus for measuring the quality and damping factor of electric high frequency circuit devices, comprising, in combination, a high frequency generator, a resonant circuit containing the circuit device to be measured and connected to the generator output, a modulation generator connected to said high frequency generator for frequency modulating the output of the latter at a rate such that free oscillations are produced in the resonant circuit in addition to the forced oscillations; means for adjusting the output frequency of said modulation generator; a high pass filter connected to the output of the resonant circuit to filter out the lower harmonics of the beat frequency between the forced and free oscillations; and measuring means connected to the input and output of said filter to measure the relative amplitudes of the input and output, whereby said amplitudes may be compared to determine the relation thereof to the resonant circuit time constant, the latter being a measure of the quality factor.

BOHDAN CARNIOL.

REFERENCES CITED

The following references are of record in the file of this patent:

UNITED STATES PATENTS

| Number | Name | Date |
|---|---|---|
| 2,252,058 | Bond | Aug. 12, 1941 |
| 2,380,791 | Rosencrans | July 31, 1945 |
| 2,408,858 | Keizer | Oct. 8, 1946 |